United States Patent [19]

Liu et al.

[11] Patent Number: 5,598,326

[45] Date of Patent: Jan. 28, 1997

[54] HIGH FREQUENCY AC/AC CONVERTER WITH PF CORRECTION

[75] Inventors: Rui Liu; Wen-Jian Gu, both of Croton-on-Hudson, N.Y.

[73] Assignee: Philips Electronics North America, New York, N.Y.

[21] Appl. No.: 591,042

[22] Filed: Jan. 25, 1996

Related U.S. Application Data

[63] Continuation of Ser. No. 197,530, Feb. 10, 1994, abandoned.

[51] Int. Cl.[6] ............................................. H02J 3/00
[52] U.S. Cl. ........................... 363/34; 363/37; 363/47; 363/98; 363/132
[58] Field of Search ........................... 363/34, 37, 95, 363/98, 126, 132, 44–48

[56] References Cited

U.S. PATENT DOCUMENTS

| | | | |
|---|---|---|---|
| 4,564,897 | 1/1986 | Okamoto et al. | 363/132 |
| 4,729,088 | 3/1988 | Wong | 363/124 |
| 5,063,490 | 11/1991 | Maehara et al. | 363/37 |
| 5,173,847 | 12/1992 | Susuki | 363/21 |
| 5,182,702 | 1/1993 | Hiramatsu et al. | 363/132 |
| 5,264,782 | 11/1993 | Newton | 323/288 |
| 5,408,403 | 4/1995 | Nerone et al. | 363/37 |

*Primary Examiner*—Peter S. Wong
*Assistant Examiner*—Adolf Berhane
*Attorney, Agent, or Firm*—Bernard Franzblau

[57] ABSTRACT

A high frequency AC/AC converter apparatus with power factor correction includes an AC/DC converter circuit part to provide power factor correction and a DC/AC inverter circuit part to produce a high frequency AC signal for operation of a load, for example, a discharge lamp. The AC/DC converter circuit part includes a diode and an inductor. The converter apparatus utilizes first and second semiconductor controlled switching devices, one of which is common to each part of the overall converter apparatus. A single control circuit controls both parts of the converter apparatus by controlling the switching of the first and second semiconductor switching devices. There are two possible control techniques, constant duty ratio control or duty ratio sweeping control. A voltage clamp circuit inhibits undesired oscillation of the diode voltage.

34 Claims, 9 Drawing Sheets

HIGH FREQUENCY AC/AC CONVERTER WITH PF CORRECTION

This is a continuation of application Ser. No. 08/197,530, filed Feb. 10, 1994 now abandoned.

BACKGROUND OF THE INVENTION

The present invention relates to apparatus for converting an AC line voltage of low frequency into a high frequency output AC voltage and, more particularly, to a low cost miniaturized electronic ballast circuit for operation of electric discharge lamps.

In prior art electronic ballast circuits, a separate power factor correction circuit is employed in order to obtain a high power factor. FIG. 1 depicts a conventional half-bridge electronic ballast where a boost converter is used for power factor correction. An EMI (electromagnetic interference) filter is coupled to the terminals of a low frequency AC line voltage, for example, 50 Hz or 60 Hz, and is used to filter out the high frequency noise generated by the high frequency operation of a boost converter and a half-bridge DC/AC inverter coupled in cascade to form the electronic ballast circuit. The line voltage is rectified by a full bridge rectifier D1–D4 to produce a pulsatory DC voltage. In the boost converter stage, which is coupled to the output of the rectifier circuit, the current flow through the inductor L is regulated based upon a reference current generated from the rectified line voltage by means of the control circuit A so that the current waveform is shaped to be the same as and to be in phase with the rectified voltage waveform. This is done by controlling the ON duty ratio and/or the frequency of the MOSFET switch Q.

The boost converter receives the pulsating DC voltage from the bridge rectifier D1–D4. When the switching transistor Q is turned on, a current flows from the rectifier bridge through the inductor L and the transistor Q so that electromagnetic energy is stored in the electromagnetic field of the inductor. When the transistor Q is switched off, the electromagnetic energy in the inductor and energy from the line are; transferred to the storage capacitors Ce1 and Ce2 of the boost converter as a result of a current that flows via the inductor L and the blocking diode D. This represents the conventional mode of operation of a boost converter.

The output of the boost converter is a DC voltage across capacitors Ce1 and Ce2 coarsely regulated by the control circuit A. This DC voltage is then inverted into a high frequency AC voltage by the high frequency half-bridge DC/AC inverter coupled to the output of the boost converter so that a regulated output power can be obtained for the load. Since the input power of the boost converter possesses a low frequency component (100 Hz or 120 Hz) and the output power of the half-bridge DC/AC inverter is a regulated high frequency power, an energy storage capacitor, here shown as capacitors Ce1 and Ce2, is placed between the boost converter stage and the half-bridge inverter stage so as to balance the input power and the output power.

Depending on the manner in which the current flow through the inductor L is controlled during each switching period, the operation mode of the boost converter can be classified into two categories, i.e. Continuous Conduction Mode (CCM) and Discontinuous Conduction Mode (DCM). In CCM, the high frequency ripple of the current through the inductor L can be made small so that the stress on the EMI filter can be reduced. A drawback of this control method is that the duty ratio of the switching MOSFET Q has to vary with the rectified line voltage, thus resulting in a more complex control circuit. In the DCM, the peak values of the current through the inductor L automatically follow the waveform of the rectified line voltage if the on time of the MOSFET is constant. Therefore, the control circuit can be greatly simplified. This advantage is the main reason why DCM is usually adopted in the boost converter stage for power factor correction in low-power applications.

An important disadvantage of the electronic ballast circuit of FIG. 1 is that the requirement of a separate power factor correction (PFC) stage and a separate DC/AC inverter stage increases the cost and size of the overall ballast device. One prior art attempt to reduce the circuit complexity is described in U.S. Pat. No. 4,564,897 (Jan. 14, 1986) in which a smoothing (i.e. power factor correction) circuit and an inverter circuit share a common switching element and the control circuit thereof. This U.S. patent is hereby incorporated by reference and discloses a power supply which employs a relatively small inductor while providing a relatively high power factor. The high frequency AC output voltage has a relatively low line-frequency ripple component which makes it suitable for operation of a discharge lamp. However, this power supply has a serious problem in that it is very difficult to regulate the inverter output at a desired stable level in the event of a variation in the input AC voltage or in the case of varying load requirements.

U.S. Pat. No. 5,182,702 (Jan. 26, 1993) describes an inverter device which attempts to solve some of the disadvantages of the prior art by providing a simpler control circuit for the overall system. This inverter device includes a full wave rectifier supplying a pulsating DC voltage from an input AC voltage to a smoothing (power factor correction) circuit. The power factor correction circuit includes an inductor, a smoothing capacitor and a switching element for chopping the pulsating DC voltage through the inductor into a smooth DC voltage at the capacitor. An inverter is provided which has a switching element common to the power factor correction circuit and operative to switch the DC voltage to apply a high frequency voltage to a load circuit including a load, an inductance and a capacitor. The inductance and capacitor define a resonant circuit providing the load with an oscillating current composed of first and second opposite flowing currents. The oscillating current flows for a nominal on-time determined by a circuit constant of the resonant circuit. A controller detects the termination of the second current and excites the common switching element at a time dependent thereon so as to start the flow of the first current. The controller includes a timer for separately controlling the actual on-time for the flow of the first current within the nominal on-time. This makes it possible to regulate the accumulated DC voltage on the smoothing capacitor at a desired level by controlling the actual on-time period of the common switching element. This circuit also has certain disadvantages which limits its use in practical applications.

SUMMARY OF THE INVENTION

It is therefore an object of the present invention to provide a low cost miniaturized electronic ballast circuit or high frequency AC/AC converter having improved operating characteristics and which is not subject to the limitations of the prior art.

It is a further object of the invention to provide a simple and compact high frequency AC/AC converter circuit having a high power factor and low current distortion.

It is another object of the invention to provide an electronic ballast circuit which requires only one control circuit and fewer switching transistors than the electronic ballast circuit shown in FIG. 1.

It is a further object of the invention to provide an electronic ballast circuit with a superior lamp ignition characteristic to that of the prior art inverter device.

A still further object of the invention is to provide an electronic ballast circuit or high frequency AC/AC converter that produces a more sinusoidal waveform and substantially reduces the level of voltage spikes generated across the diodes of the full-wave rectifier at the input of the electronic ballast circuit or high frequency converter.

Another object is to provide an electronic ballast circuit including a high frequency DC/AC inverter part utilizing a resonant LC circuit that improves the circuit performance and makes for greater flexibility in circuit design.

It is a further object of the invention to combine the functions of the PFC boost converter and the high frequency DC/AC inverter into a single combination AC/AC inverter with input power factor correction.

It is yet another object of the invention to use a pulse width modulation (PWM) technique which results in a very simple control circuit for the electronic ballast.

The foregoing and other objects and advantages of the invention are achieved, inter alia, by combining the separate functions of the input PFC boost converter and the high frequency DC/AC inverter into a single stage high frequency AC/AC inverter with power factor correction thereby providing power factor correction and a high frequency DC/AC inverter operating characteristic.

Since there are two separate stages in the prior art system shown in FIG. 1, two separate control circuits are required. The combination circuit of the present invention combines both the power factor correction stage and the high frequency inverting stage into a single stage so that one power stage and its corresponding control circuitry are no longer required and the circuit cost is thereby reduced.

In a preferred embodiment of the invention, a pair of input terminals for connection to a 60 Hz AC line voltage or the like is connected to a pair of input terminals of the high frequency AC/AC converter with power factor correction via an electromagnetic interference (EMI) filter and a diode bridge rectifier circuit. A series circuit comprising a first inductor, a diode, first and second capacitors, a second inductor and the primary winding of an output transformer is connected to the input terminals of the high frequency converter. The second input terminal is connected to a common line of the high frequency converter. A first switching field effect transistor (FET) is connected to a first junction point between the diode and the first capacitor and to the common line. A second switching FET is connected to a second junction point between the first and second capacitors and to the common line. The transformer secondary winding is coupled to the load (e.g. a discharge lamp) and a single control circuit receives a feedback signal from the load circuit to control the switching of the first and second field effect transistors at a high frequency. A third capacitor is coupled across the transformer secondary winding and forms an LC resonant circuit with the second inductor.

Two distinct control techniques can be employed in accordance with the present invention. One is constant duty ratio control and the other is duty ratio sweeping control. These control techniques will be described in greater detail in connection with the detailed description of the drawings.

BRIEF DESCRIPTION OF THE DRAWINGS

The foregoing and other objects and advantages of the present invention will become apparent from the following detailed description thereof when taken in conjunction with the accompanying drawings, in which.

DESCRIPTION OF THE PREFERRED EMBODIMENTS

Figure 1:
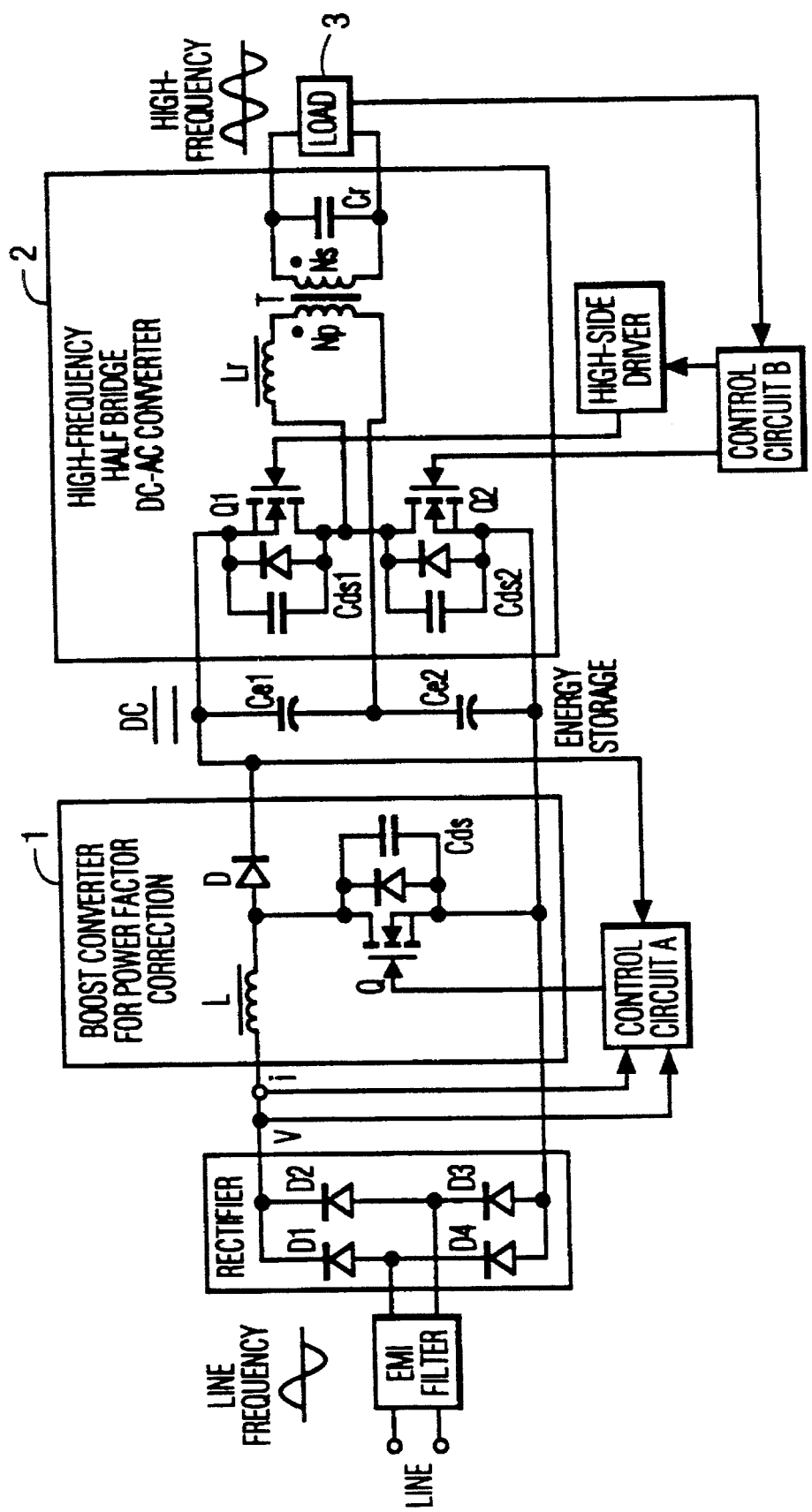
FIG. 1 is a block schematic diagram of a conventional electronic ballast circuit with input PFC.

FIG. 1 shows a conventional electronic ballast circuit with input PFC, which includes a boost converter 1 that provides the power factor correction function and a high frequency half bridge DC/AC inverter 2 that supplies a high frequency energizing current to the load (discharge lamp) 3. A first control circuit A controls a switching FET Q in the boost converter and a second control circuit B controls the high frequency switching FETs Q1 and Q2 in the high frequency inverter. This conventional circuit has been described above and therefore will not be further discussed. The requirement of a separate PFC stage and a separate HF DC/AC inverter stage increases the cost and size of the overall ballast system shown in FIG. 1.

Figure 2:
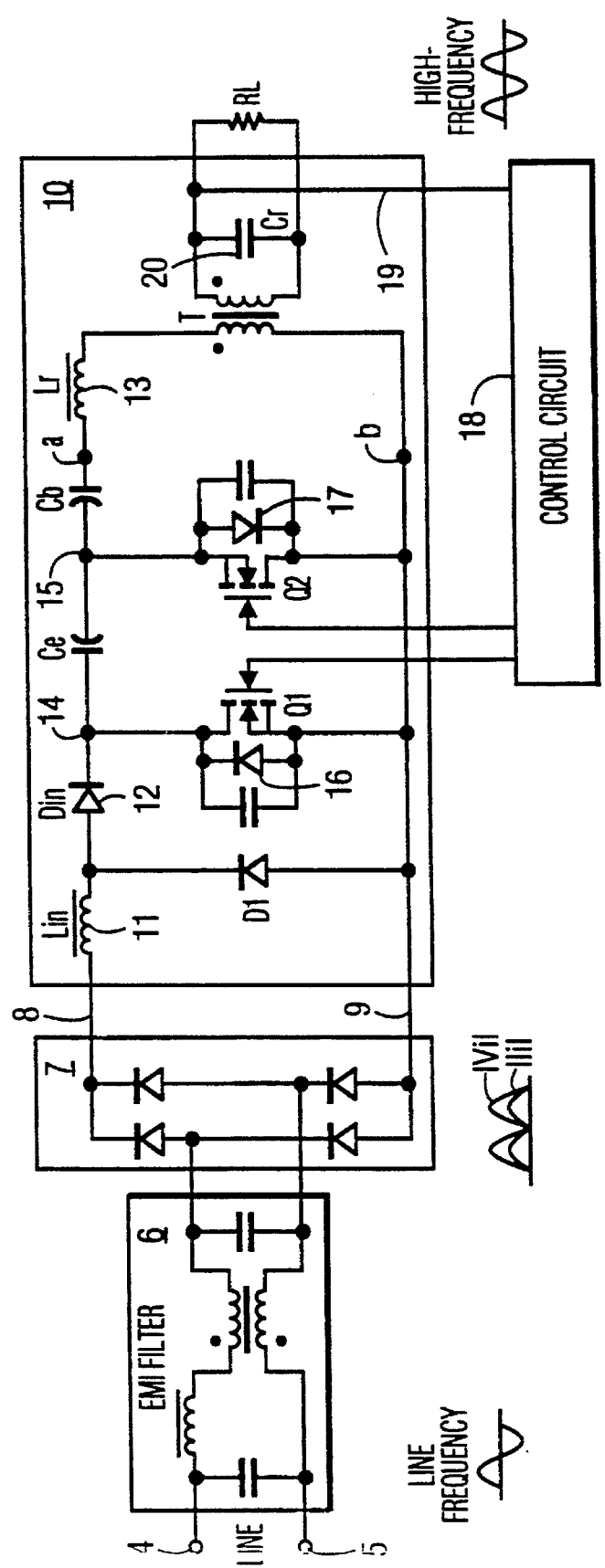
FIG. 2 is a block schematic diagram of a first embodiment of the invention.

Referring now to FIG. 2, there is shown a block schematic diagram of a basic arrangement in accordance with a first embodiment of the present invention. A pair of input terminals 4, 5 supply a 60 Hz (50 Hz) AC line voltage to an EMI filter 6. The output of the EMI filter is in turn connected to input terminals of a bridge rectifier circuit 7 which produces a pulsating DC voltage at its output terminals 8, 9. Terminal 8 is positive with respect to terminal 9.

Terminals 8 and 9 are connected to the input lines of the combination PFC boost converter-high frequency DC/AC inverter 10. A series circuit consisting of a power factor correction inductor 11, blocking diode 12, energy storage capacitor Ce and DC blocking capacitor Cb, a resonant inductor 13 and the primary winding of an output transformer T is connected to the supply terminals 8 and 9.

A first switching MOSFET Q1 is connected between a junction point 14 and the common line 9. This switching element is common to both the boost converter circuit part and the high frequency inverter circuit part of the combination circuit 10. A second switching MOSFET Q2, which is only a part of the HF inverter circuit part, is connected between a junction point 15 and the common line 9. Diodes 16 and 17 are connected in parallel with the switching transistors Q1 and Q2, respectively. Small capacitors are connected in parallel with the diodes 16 and 17. These diodes and capacitors may be inherent components of the MOSFET devices Q1 and Q2.

The secondary winding of transformer T is connected to a load illustrated as a resistor RL. In one preferred embodiment of the invention, the load is one or more discharge lamps and the combination PFC converter/HF inverter constitutes an electronic ballast circuit for the discharge lamp(s). A resonant capacitor 20 is connected across the secondary winding of transformer T and in parallel with the load RL.

A voltage clamp diode D1 is connected between the junction of inductor 11 ($L_{in}$) and diode 12 ($D_{in}$) and the common return line 9.

A single control circuit 18 has first and second output lines coupled to respective control electrodes of the switching transistors Q1 and Q2 in order to control the high, frequency switching thereof. The control circuit is itself controlled as a function of the load voltage, which is schematically represented by the input control line 19.

The two MOSFETs Q1 and Q2 are turned on and off alternately by the control circuit 18 at a fixed duty ratio D, which is defined as the on-time of the switching device Q1 over one switching period $T_s$, i.e. $D=T_{on}/T_s$. Inductor 11 ($L_{in}$), diode 12 ($D_{in}$), MOSFET Q1, body diode 17 of MOSFET Q2, and energy storage capacitor $C_e$ form a boost converter for power factor correction. The half-bridge DC/AC inverter consists of MOSFETs Q1, Q2, the energy storage capacitor $C_e$, DC blocking capacitor $C_b$, resonant inductor 13 ($L_r$), isolation transformer T, and resonant capacitor 20 ($C_r$).

For the boost converter part of the circuit, the duty ratio of MOSFET Q1 is fixed during each line period in order to avoid large low frequency (120 Hz or 100 Hz) ripple at the output. Therefore, it is preferable that the operation mode of the boost converter be DCM. Regulation of the output voltage $V_{ce}$ of the boost converter, which is produced across the capacitor $C_e$, is achieved by controlling the duty ratio of MOSFET Q1. This control method is termed constant duty ratio control and a detailed description of the operation of the control circuit will be given below. When transistor Q1 is turned on, the rectified line voltage is applied to the inductor 11 ($L_{in}$). Thus, its current is linearly increased from zero as follows:

$$i_{in} = \frac{|V_{in}|}{L_{in}} t \qquad (1)$$

where $|V_{in}|$ represents the rectified line voltage at the bridge rectifier output terminals 8, 9 during the on-time interval of transistor Q1. The voltage $|V_{in}|$ can be considered to be constant over a high frequency switching cycle. Energy is stored in the inductor $L_{in}$ when transistor Q1 is on. The peak current is obtained as follows:

$$i_{in} = \frac{|V_{in}|}{L_{in}} \times DT_s \qquad (2)$$

where D is the duty ratio and $T_s$ is the switching period. Equation (2) indicates that the peak values of the inductor current $i_{in}$ follows the waveform of $|V_{in}|$ since both $T_s$ and D are constant. When switching transistor Q1 is turned off, the inductor current $i_{in}$ continues to flow via the body diode 17 of MOSFET Q2. Therefore, the voltage across $L_{in}$ is given by:

$$V_{Lin} = |V_{in}| - V_{ce} \qquad (3)$$

The inductor current charges the capacitor $C_e$ and the energy stored in $L_{in}$ during the on period of transistor Q1 is transferred to capacitor $C_e$. Thus, the inductor current is linearly discharged as follows:

$$i_{in} = \frac{|V_{in}|}{L_{in}} \times DT_s - \frac{V_{ce} - |V_{in}|}{L_{in}} \times (t - t_{off}) \qquad (4)$$

where $t_{off}$ is the instant of time when transistor Q1 is turned off. When the current reaches zero, it stays at zero ideally due to the presence of diode 12. The voltage across the inductor 11 will be equal to zero ideally, resulting in a voltage of $V_{ce} - |V_{in}|$ across the diode 12. However, due to the presence of the reverse recovery current and the junction capacitance of the diode 12, an undesirable oscillation appears in the voltage of the diode 12. This oscillation not only causes extra power loss in the diode 12 ($D_{in}$) but also causes excessive voltage stress of this diode which may shorten the diode lifetime. A diode $D_1$ is therefore added between the junction of inductor 11 and diode 12 and the common return line 9 in order to clamp the maximum diode voltage to the voltage $V_{ce}$ of the storage capacitor $C_e$. This method is effective but it is not optimum simply because the diode voltage is not clamped to its steady state value $V_{CE} - |V_{in}|$. Therefore, some small oscillation still remains. The current $i_{in}$ flowing through the inductor 11 has a triangular waveform. Its average current over one switching period is obtained as follows from analysis:

$$I_{in} = \frac{D^2 T_s V_{ce}}{2L_{in}} \frac{|V_{in}|/V_{CE}}{1 - |V_{in}|/V_{CE}} \qquad (5)$$

With the high-frequency harmonics filtered by the EMI filter, the line current is equal to the average current $I_{in}$. Therefore, line current $i_{line}$ is obtained as follows from (5) with the substitution of $|V_{in}| = Vm \, SinWT$ considering the rectification:

$$i_{line} = \frac{D^2 T_s V_{ce}}{2L_{in}} \frac{\frac{1}{M_p}}{1 - \frac{1}{M_p}|SinWT|} \cdot SinWT \qquad (6)$$

where, $$M_p = \frac{V_{ce}}{V_m} \qquad (7)$$

Figure 3:
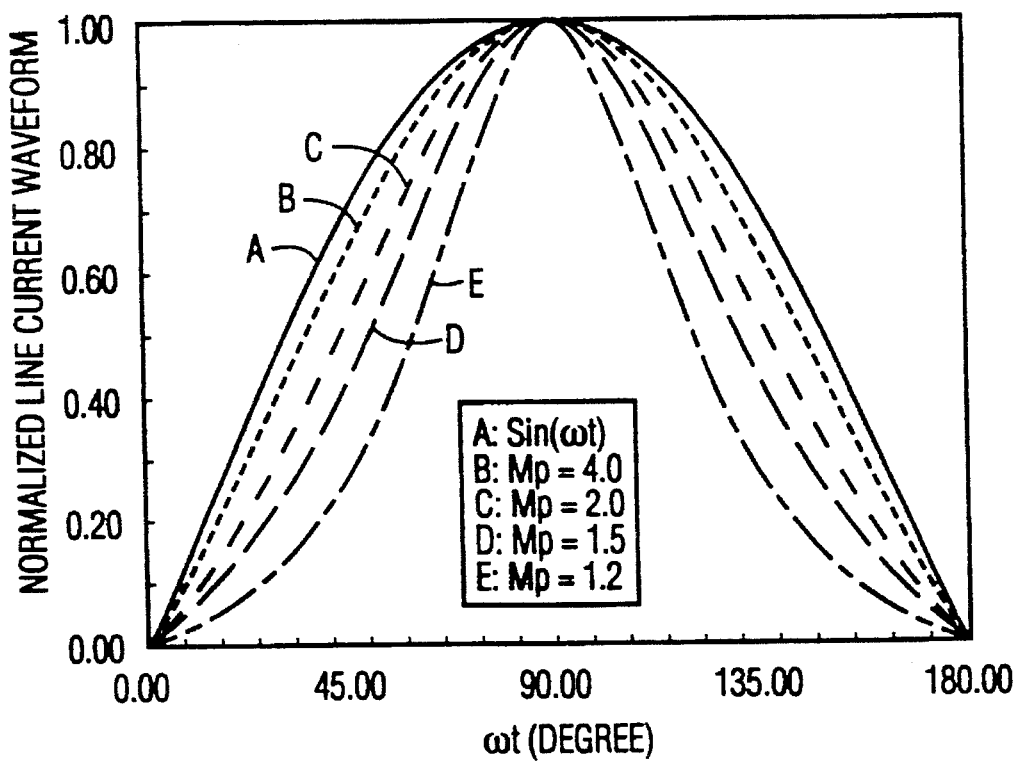
FIG. 3 is a graphical representation of the relationship of the normalized line current waveform over a half cycle as a function of the normalized energy storage capacitor voltage (Gain) using a constant duty ratio control scheme.

It can be seen that the current $i_{line}$ is basically a sine wave current with distortion introduced by the term $$1 - \frac{1}{M_p}|SinWT|$$

when the duty ratio D is fixed. FIG. 3 shows the graphical representation of the line current over one line period. With the normalization by $$\frac{D^2 T_s V_{CE}}{2L_i} \quad \frac{1}{M_p}$$

taking $M_p$ as a parameter. From FIG. 3, it is seen that as $M_p$ is made larger, the sine wave is closer to the line current, resulting in a higher power factor and a lower THD (total harmonic distortion). However, higher $M_p$ results in higher $V_{ce}$, which will increase the voltage stress of the FETs Q1 and Q2. Therefore, there is a trade-off between the stress of the FETs and the converter performance.

In the half-bridge DC/AC inverter part of the circuit, due to the switching action of transistors Q1 and Q2, a square wave voltage without a DC component is applied to the resonant circuit consisting of inductor 13 and capacitor 20 ($L_r$, $C_r$), and the isolation transformer T. The resonant circuit is closely tuned to the fundamental harmonic of the square wave voltage $V_{ab}$ so that the voltage across the resonant capacitor 20 ($C_r$) is substantially a high frequency sine wave. Thus, high frequency power will be supplied to the load RL.

If the high frequency DC/AC inverter part of the circuit is designed so that the resonant frequency of the resonant circuit is lower than the switching frequency, zero-voltage switching of the switching transistors Q1 and Q2 can be obtained if a small dead time interval is provided for the gate control signals. During the dead time interval, both MOSFETs are turned off. Transistors Q1 and Q2 are then "on" in mutually exclusive time intervals. The current through the resonant inductor will charge the drain-source capacitor of one transistor and will discharge the drain-source capacitor of the other transistor. Therefore, the drain-source voltage increases gradually after a MOSFET is turned off and falls to zero before the MOSFET is turned on. Thus, the circuit provides zero-voltage switching of the transistors Q1 and Q2.

Figure 4:
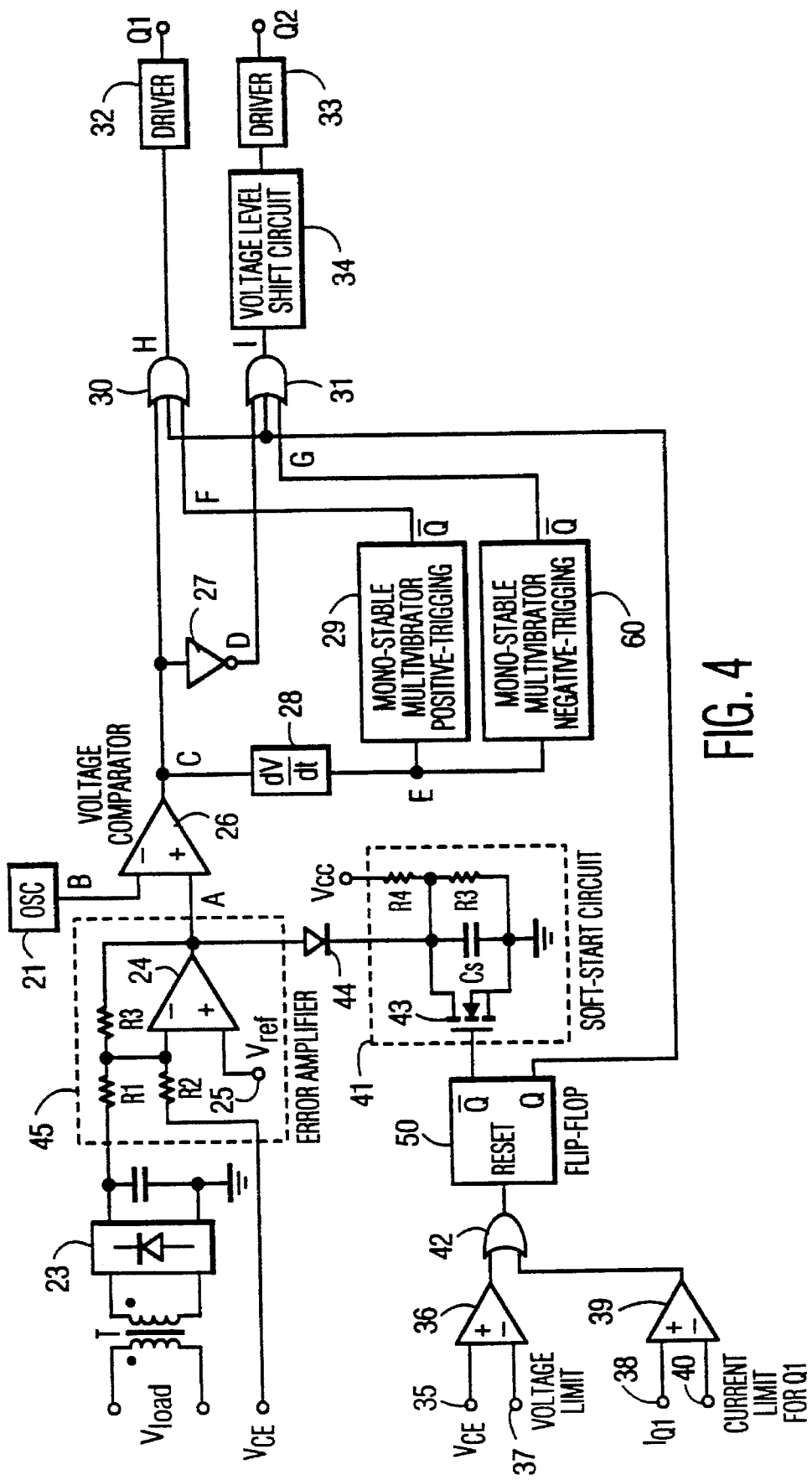
FIG. 4 is a block schematic diagram of a control circuit for constant duty ratio control, FIG. 5 provides a time diagram of the signals present in the constant duty ratio control circuit of FIG. 4.
Figure 5:
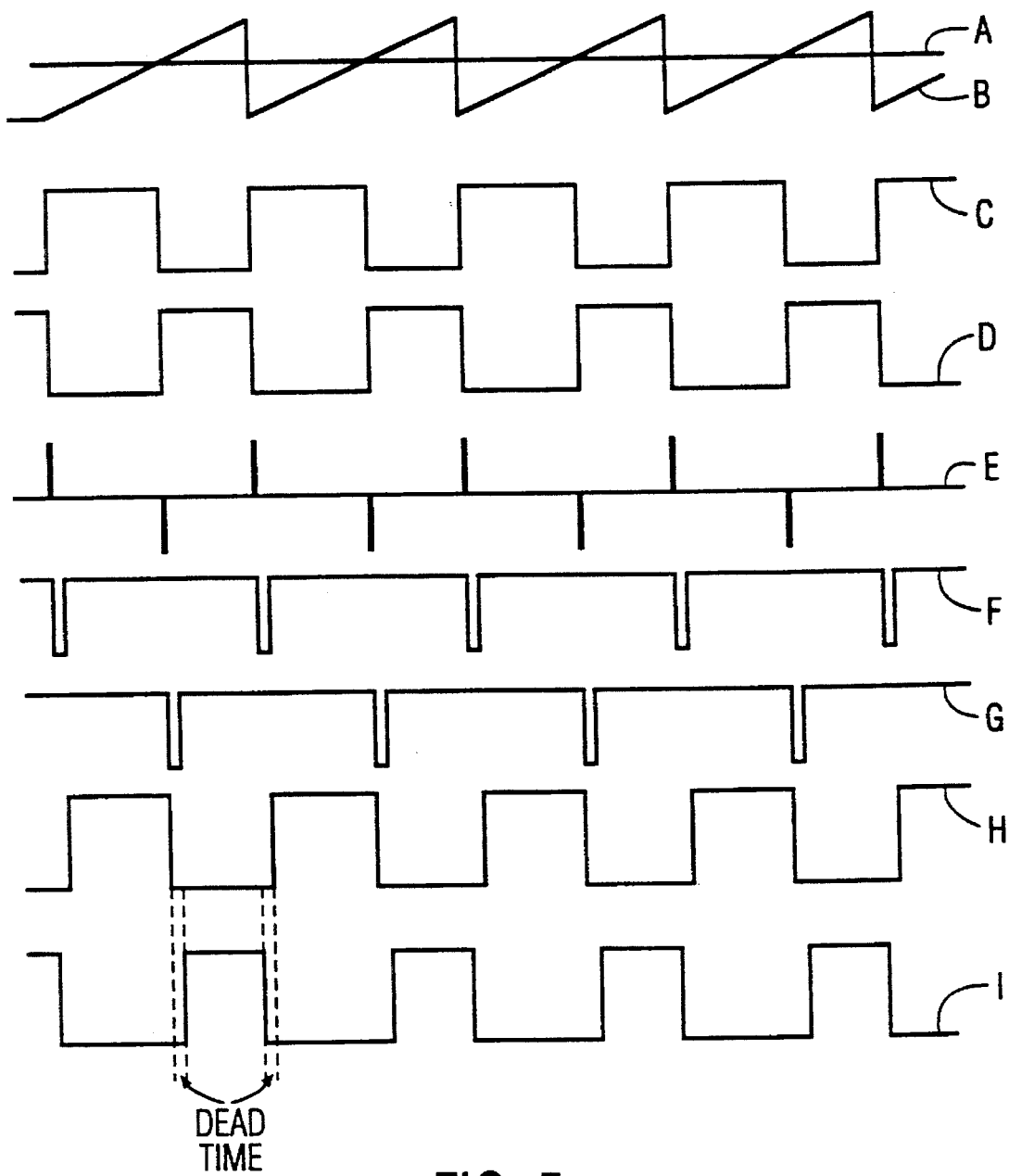

A block diagram of the constant duty ratio control circuit and the timing relations for the signals of the control circuit are shown in FIG. 4 and FIG. 5, respectively. The switching frequency is determined by the oscillator 21 which generates a sawtooth wave signal B as shown in FIG. 5. The output voltage of the inverter 10 is fed back to the primary side of the transformer T through an additional winding 22 of the same isolation transformer T and then is rectified by a rectifier 23 to obtain a DC voltage. This DC voltage and the energy storage capacitor voltage $V_{ce}$ are fed to the inverting (−) terminal of an error amplifier 24 via resistors R1 and R2, respectively. A feedback resistor R3 is coupled between the output and inverting input of the error amplifier.

These voltages are compared with a reference voltage $V_{ref}$ presented to the non-inverting (+) terminal of the error amplifier from a terminal 25 so as to generate an error voltage signal A at the output of the error amplifier. Strictly speaking, the error amplifier comprises all of the elements within the box 45 shown in dashed lines. The signals A and B (see FIG. 5) are fed to the non-inverting (+) and inverting (−) terminals of a voltage comparator 26 to generate a PWM (Pulse Width Modulated) output signal C having the waveform shown in FIG. 5. An inverter 27 is employed to produce the complementary output waveform D (see FIG. 5) of signal C.

The signal C is also applied to a voltage differentiator circuit 28 to generate a sequence of pulse signals E to trigger two monostable multivibrators 29 and 30. The monostable multivibrators are used to generate the dead time intervals for zero-voltage switching when their complementary outputs are combined with the signals C and D, respectively, via respective AND gates 30 and 31 as shown in FIG. 4. The outputs H and I of the AND gates 30 and 31, respectively, are the desired control signals for the switching devices Q1 and Q2, as shown in FIG. 5. The control signal I for the switching device Q2 requires a voltage level shift circuit 34. Driving circuits 32 and 33 are employed to provide enough power to drive the switching devices Q1 and Q2, respectively.

In the case of a high line voltage or a light output load, the output voltage $V_0$ and the energy storage capacitor voltage $V_{ce}$ will increase, resulting in a decrease of the signal A at the output of the error amplifier. From FIG. 5, it can be seen that the duty ratio of control signal H will be reduced if signal A decreases. Therefore, the output voltage and the energy storage capacitor voltage are reduced to provide a compensation that results, resulting in a constant output voltage. In the case of a low line voltage or a heavy output load, the voltage $V_0$ and the energy storage capacitor voltage $V_{ce}$ will decrease. The output signal A of the error amplifier then will increase, resulting in an increase of the duty ratio of control signal H. Thus, $V_0$ and $V_{ce}$ are kept constant.

The control circuit of FIG. 4 also includes a protection circuit and a soft-start circuit. The storage capacitor voltage $V_{ce}$ at terminal 35 is applied to the non-inverting input (+) of a comparator 36 having its inverting input (−) connected to a terminal 37 which supplies a voltage limit reference voltage. The terminal 38 supplies a signal voltage proportional to the current $I_{Q1}$ in the switching transistor Q1 (FIG. 2) to the non-inverting input (+) of a further comparator 39. The inverting input (−) of the comparator 39 is coupled to a terminal 40 which supplies a current limit reference voltage (for transistor Q1).

The outputs of comparators 36 and 39 are coupled to the reset input of a flip-flop 50 via an OR gate 42. The Q output of the flip-flop 50 is coupled to the AND gates 30 and 31, while the $\overline{Q}$ output is coupled to a soft-start circuit 41. A pair of series connected resistors R4 and R5 are connected between a supply voltage terminal $V_{cc}$ and ground. A parallel circuit of a FET 43 and a capacitor $C_s$ are coupled across resistor R5 and with the gate of the transistor coupled to the output of the OR gate. A diode 44 is connected between the output of error amplifier 24 and the node between resistors R4 and R5.

When the circuit is first turned on, the soft-start capacitor $C_s$ is slowly charged up from zero through the resistors R4, R5 and the voltage source $V_{cc}$. The duty ratio of control signal H is also slowly increased from zero to its steady state value, resulting in a soft-start procedure.

When the energy storage capacitor voltage $V_{ce}$ or lowside switching device current $I_{Q1}$ exceeds its limit, the output of the OR gate 42 goes high to reset the flip-flop 50 to a low level. The AND gates 30 and 31 are then closed. No signal will be applied to the gates of FETs Q1, Q2. The power converter will be shut down. At the same time, the $\overline{Q}$ output of the flip-flop 50 goes to a high level, turning on the field effect transistor 43. The voltage across the soft-start capacitor $C_s$ is discharged to zero through the transistor making the circuit ready for the next soft-start.

The constant duty ratio control circuit is relatively simple and provides a high power factor (>0.99) and a low THD (<10%). However, these features are obtained at the cost of a high storage capacitor voltage $V_{ce}$, which also results in high voltage stress in the power MOSFETs.

A second control scheme, that is, duty ratio sweeping control is introduced to overcome the above problems. As can be seen from (6), a sinusoidal line current $i_{line}$ can be obtained if the duty ratio is swept as follows over half a line period:

$$D = D_{max}\sqrt{1 - \frac{1}{M_p}|SinWT|} \qquad (8)$$

Figure 6:
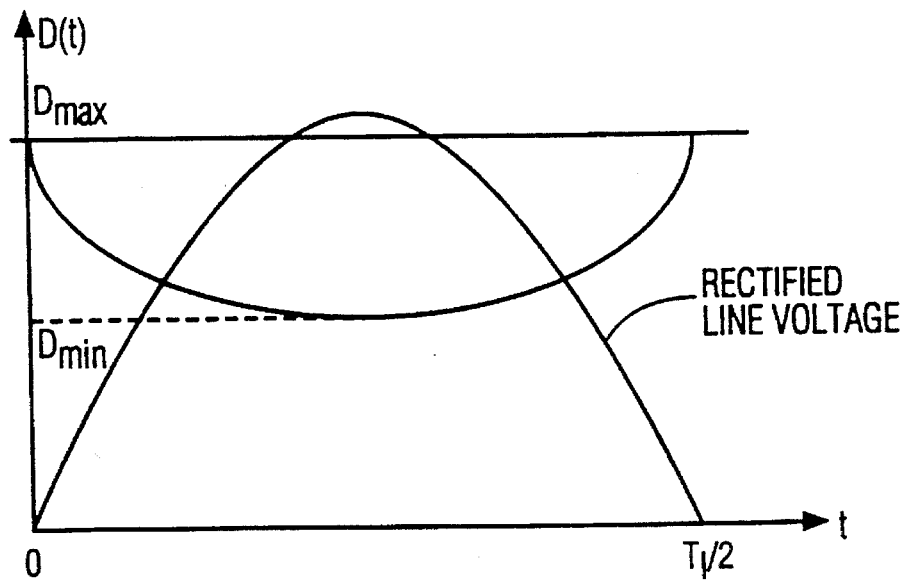
FIG. 6 is a time diagram showing the variation of duty ratio (D) over a half line period $T_1$.

A plot of duty ratio D over half a line period is shown in FIG. 6 together with the line voltage waveform. The duty ratio reaches a minimum when the line voltage is at its peak:

$$D_{min} = D_{max}\sqrt{1 - \frac{1}{M_p}} \qquad (9)$$

To reduce the current stress, the inductance of the power factor correction inductor 11 should be chosen so that its current reaches zero just prior to the turn on of FET Q1. In this case, the voltage conversion ratio can be obtained as in a CCM boost converter.

$$M_p = \frac{1}{1 - D_{min}} \quad (10)$$

Therefore, the following is obtained from (9) and (10):

$$D_{min} = 1 - \frac{1}{M_p} \quad (11)$$

$$D_{max} = \sqrt{1 - \frac{1}{M_p}} \quad (12)$$

Figure 7:
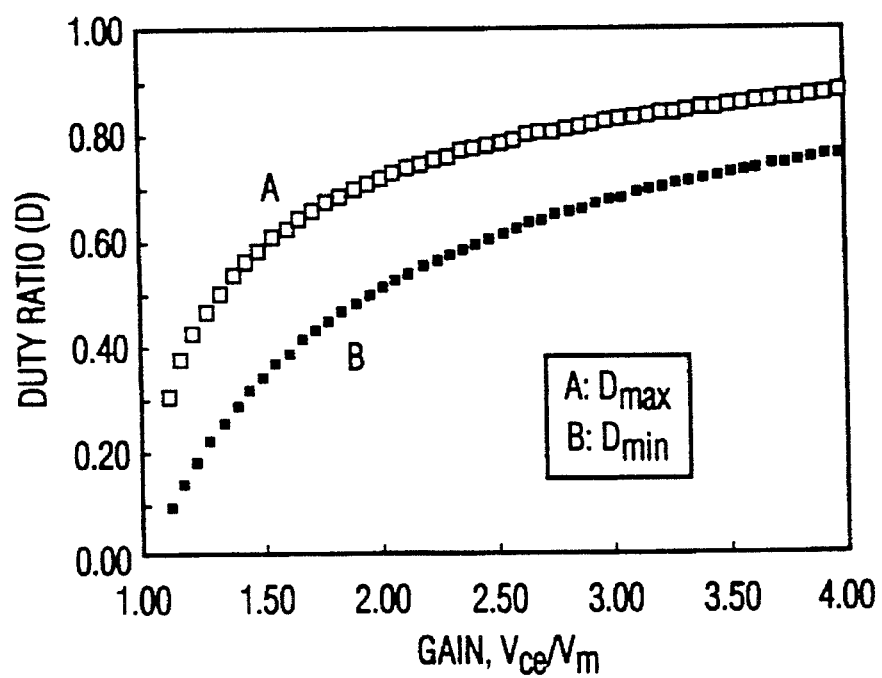
FIG. 7 is a graph of the ratio of maximum and minimum duty ratio for duty ratio sweep control.

FIG. 7 shows the maximum and minimum duty ratios as a function of $M_p$.

The circuit for duty ratio sweeping control according to (8) is similar to that of the constant duty ratio control circuit except that an extra function for the duty ratio sweep is added. This sweep function is accomplished by means of a square-root calculation stage 46 and a duty ratio sweeping range control circuit 47 as shown in FIG. 8.

Figure 8:
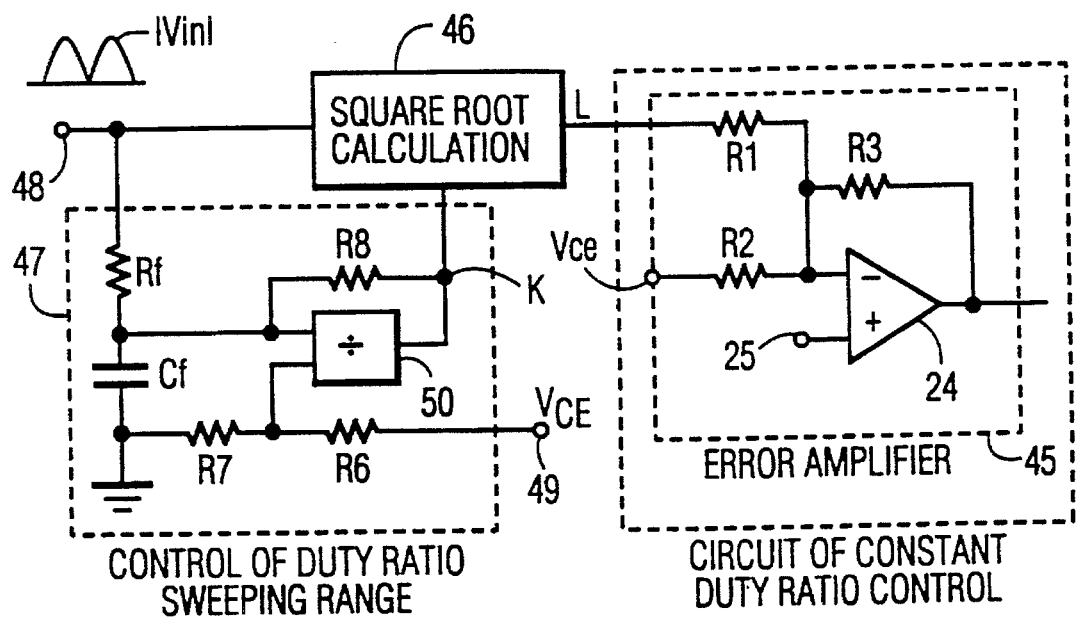
FIG. 8 is a block schematic diagram of a part of a control circuit for duty ratio sweep control.

In FIG. 8, the rectified line voltage $|V_{in}|$ is applied to the square-root calculation stage 46 from a terminal 48 and to a low pass filter consisting of a resistor $R_f$ and a capacitor $C_f$ which provide a voltage proportional to the amplitude of the rectified line voltage $V_m$. A voltage $V_{R7}$ which is proportional to the storage capacitor voltage $V_{ce}$ is also obtained through a resistor divider consisting of resistors R6 and R7 coupled to a terminal 49 which provides the voltage $V_{ce}$. The voltage $V_{R7}$ across resistor R7 is then divided by the voltage $V_m$ in the divider circuit 50 in order to obtain a signal K proportional to $M_p$. Hence, a signal L at the output of the square-root calculation stage exhibits a square root waveform as expressed by the right side of equation (8). The signal L is coupled via resistor R1 to the inverting terminal of the error amplifier 24 in the control circuit diagram of FIG. 4 so as to control the duty ratio of the control signal H.

By introducing duty ratio sweeping control over each line period $T_l$, a high input power factor and low THD can be obtained while keeping the voltage $V_{ce}$ low to reduce the switch stress. However, the use of duty ratio sweeping control results in an increase of the low frequency ripple in the output voltage. In lighting applications, such low frequency voltage ripple is represented by a parameter called crest factor, which is defined as the peak voltage divided by the rms value of the output voltage. As long as the value of the crest factor is less than 1.7, the presence of low frequency ripple in the output voltage is acceptable.

As discussed above, the converter circuit of FIG. 2, with or without the clamp diode D1, contains an undesired oscillation in the diode voltage ($V_{Din}$) of blocking diode 12.

Figure 9:
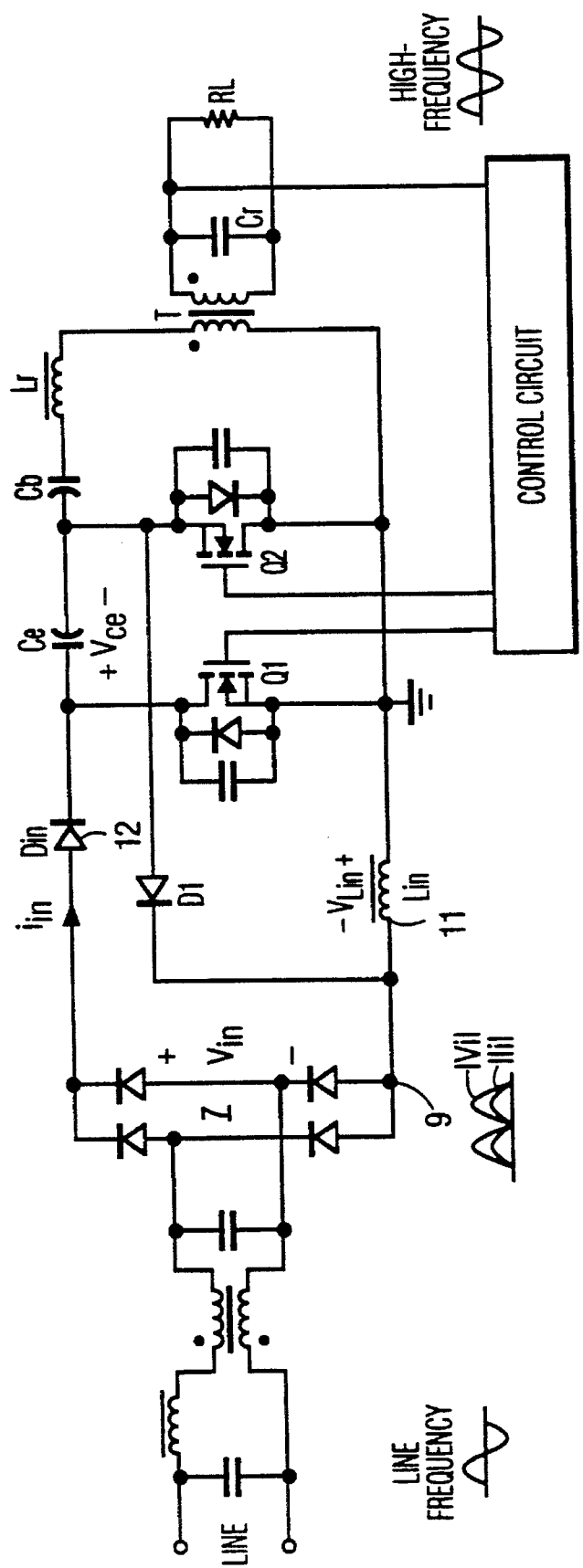
FIG. 9 is a block schematic diagram of a second embodiment of the invention.

A more effective method of removing the unwanted oscillation is to clamp the diode voltage $V_{Din}$ as shown in FIG. 9. In this embodiment, the inductor 11 ($L_{in}$) is connected between the negative terminal 9 of the full bridge rectifier 7 and a ground line. The voltage clamping diode D1 now is connected between the terminal 9 and the source terminal of the switching device Q2. In the circuit shown in FIG. 9, the diode 12 voltage will increase from zero and the inductor voltage will increase to zero from a negative value after the diode $D_{in}$ is turned off. When the inductor voltage $V_{Lin}$ reaches zero and becomes positive, the clamp diode D1 conducts because the MOSFET Q2 is on and the positive voltage of $V_{Lin}$ biases the diode D1 positively. Therefore, the inductor voltage is clamped at zero, which is its steady state value when $i_{Lin}=0$. Consequently, the diode voltage $V_{Din}$ equals to $V_{ce}-|V_{in}|$, its steady state value when it is in the off state. Thus, there is no oscillation produced in the converter circuit of FIG. 9. Aside from the foregoing description, the converter circuit of FIG. 9 operates in a similar manner to that of FIG. 2.

Figure 10:
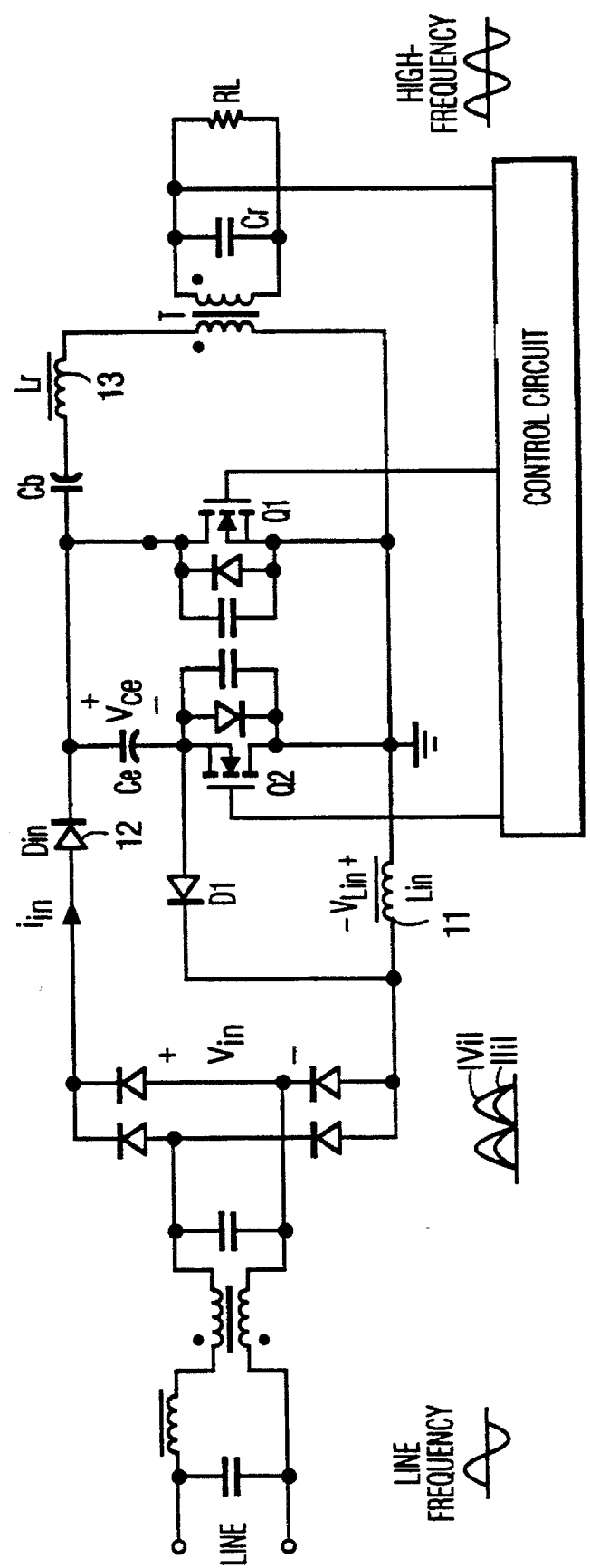
FIG. 10 is a block schematic diagram of a third embodiment of the invention in which the resonant circuit is connected to the MOSFET Q1.

Another embodiment of the invention is shown in FIG. 10. This circuit is similar to that of FIGS. 2 and 9 except for the manner in which the resonant circuit consisting of $L_r$, $C_b$, $C_r$, T and RL is connected to the switching MOSFET Q1. In FIG. 10, the inductor 11 is again connected in the return line, as in FIG. 9. The energy stored capacitor $C_e$ is no longer in series circuit with the capacitor $C_b$ and the inductor 13 ($L_r$), but is still connected between the cathode of diode 12 ($D_{in}$) and the transistor Q2. The clamp diode D1 is connected as in FIG. 9.

Figure 11:
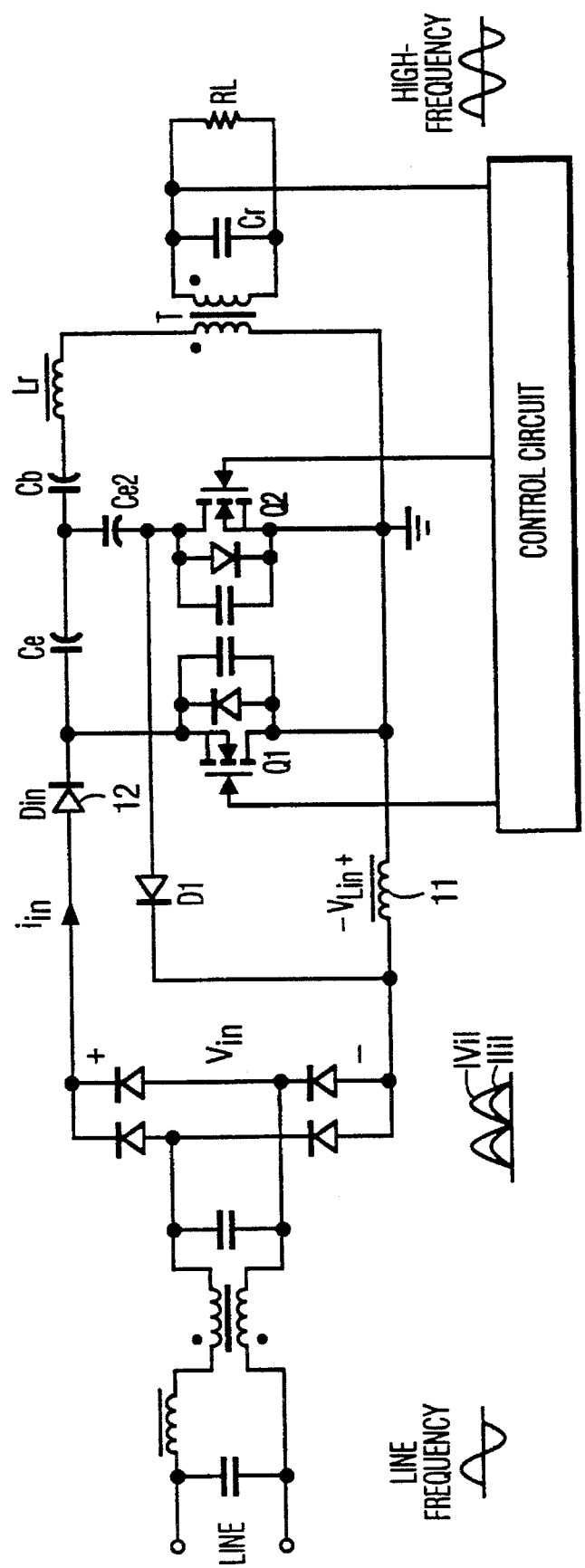
FIG. 11 is a block schematic diagram of a fourth embodiment of the invention showing a half-bridge connection of the resonant circuit.

FIG. 11 shows another embodiment of the invention comprising a half-bridge connection of the resonant circuit of the overall converter circuit. The energy storage capacitor $C_e$ is now made up of two separate storage capacitors $C_{e1}$ and $C_{e2}$. These two storage capacitors are connected in series between the cathode of diode 12 ($D_{in}$) and the FET Q2. The two energy storage capacitors $C_{e1}$ and $C_{e2}$ act as a voltage divider, too. In this case, DC blocking capacitor $C_b$ is no longer required.

In FIG. 2, FIG. 9, FIG. 10 and FIG. 11, the N-channel FET Q2 can be replaced by a P-channel FET with its source grounded. In this case, the voltage level shift circuit 34 in the control circuit of FIG. 4 can be eliminated. The operation remains the same.

If isolation is not required, the isolation transformer can be removed.

In view of the fact that the power factor correction boost converter and the high frequency DC/AC inverter share a switching transistor and the control circuit, the invention requires fewer components so that both the cost and size of the overall circuit are reduced while the power factor is high and the current distortion is low. The zero-voltage switching of both of the MOSFETs reduces switching losses and EMI noise. Since the PWM technique can be used to regulate the line variation and power factor correction is inherent in this circuit, the control circuit can be very simple. The duty ratio sweep control varies the duty cycle so as to make the input current waveform more sinusoidal, another attractive feature of the invention. The reactive power is kept low by choosing a duty ratio of approximately 0.45, resulting in a small size and reduced conduction loss. The system also substantially reduces or completely eliminates the oscillation in the diode voltage ($V_{Din}$) for all practical purposes.

It is to be understood that the above described embodiments are merely illustrative of the principles of the invention and that other arrangements may be devised by those skilled in the art without departing from the spirit and scope of the invention.

What is claimed is:

1. A high frequency converter apparatus comprising:

first and second input terminals for connection to a source of DC supply voltage for the converter, output means including a resonant circuit for connection to a load to be driven by the converter, first and second controlled switching devices of the same type, a first series circuit including an inductor, a rectifier element, and said first controlled switching device coupled to said input terminals such that current flows from the input terminals through the rectifier element when the first controlled switching device is conductive, a storage capacitor coupled to said rectifier element and to said output means, said second controlled switching device being coupled to said storage capacitor, first and second diodes coupled across said first and second controlled switching devices, respectively, and a control circuit responsive at least to a voltage developed across the storage capacitor and having output means coupled to control electrodes of the first and second controlled switching devices so as to alternately trigger the first and second controlled switching devices on and off at a high frequency, said first switching device providing power factor correction and also being a part of a high frequency DC/AC inverter.

2. A converter apparatus as claimed in claim 1 further comprising a voltage clamp coupled to at least one of said rectifier element and said inductor in a manner so as to clamp the voltage of the rectifier element to a steady state value.

3. A converter apparatus as claimed in claim 2 wherein said voltage clamp comprises a diode coupled to a node between the inductor and rectifier element and to one of said input terminals.

4. A converter apparatus as claimed in claim 1 wherein said storage capacitor, an isolation capacitor and said output means are connected in a second series circuit across the first switching device and with the second switching device coupled to a junction point between said storage capacitor and said isolation capacitor and to one of the input terminals.

5. A converter apparatus as claimed in claim 4 wherein said output means comprises:

a second inductor and a first winding of an isolation transformer connected in series to the isolation capacitor, and a further capacitor coupled to a second winding of the isolation transformer, said second inductor and said further capacitor forming a part of said resonant circuit.

6. A converter apparatus as claimed in claim 4 wherein said rectifier element is connected to the first input terminal and the inductor is connected to the second input terminal, and a voltage clamp comprising a diode is coupled to one main electrode of the second switching device and to said second input terminal thereby to clamp the voltage of the rectifier element.

7. A converter apparatus as claimed in claim 1 wherein said storage capacitor is sub-divided into first and second capacitors and with the first capacitor, and said output means connected in a second series circuit across the first switching device and with the second capacitor coupled between the second switching device and a junction point between the first capacitor and the output means.

8. A converter apparatus as claimed in claim 7 wherein said rectifier element is connected to the first input terminal and the inductor is connected to the second input terminal, and further comprising:

a voltage clamp comprising a diode coupled to one main electrode of the second switching device and to said second input terminal thereby to clamp the voltage of the rectifier element.

9. A converter apparatus as claimed in claim 1 wherein said rectifier element is connected to the first input terminal and the inductor is connected to the second input terminal, and means connecting said storage capacitor, the second switching device, the rectifier element and the inductor in a second series circuit across said first and second input terminals.

10. A converter apparatus as claimed in claim 9 further comprising:

a voltage clamp comprising a diode coupled to one main electrode of the second switching device and to said second input terminal thereby to clamp the voltage of the rectifier element.

11. A converter apparatus as claimed in claim 1 wherein said input terminals supply a pulsatory DC input voltage to the first series circuit, and wherein said control circuit includes a square root circuit responsive to said input voltage so as to sweep the duty ratio of the first and second controlled switching devices between a maximum value and a minimun value.

12. A converter apparatus as claimed in claim 1 wherein said control circuit further comprises an ocillator and means controlled by the oscillator and at least said storage capacitor voltage for generating first and second switching voltages for application to the respective control electrodes of the first and second controlled switching devices via the output means of the control circuit to produce zero-voltage switching of said switching devices at a constant duty ratio.

13. A converter apparatus as claimed in claim 12 wherein said voltage generating means of the control circuit further comprises, an error amplifier controlled by said storage capacitor voltage and a voltage representative of the load voltage, and a voltage comparator responsive to output voltages produced by said oscillator and said error amplifier.

14. A converter aparatus as claimed in claim 1 wherein the DC supply voltage varies repetitively and said control circuit further comprises;

a duty ratio sweeping control circuit including a square root circuit controlled by a voltage determined by the repetitive DC supply voltage and by said storage capacitor voltage to derive an output signal of the square root circuit for control of first and second switching voltages for switching the first and second switching devices with a square root duty cycle that varies as a function of the repetitive variation of the DC supply voltage.

15. A converter apparatus as claimed in claim 14 wherein said duty ratio sweeping control circuit further comprises;

a low-pass filter connected to receive said voltage determined by the repetitive DC supply voltage, and a divider circuit connected to receive an output voltage of the low-pass filter and said storage capacitor voltage and having an output that supplies a control voltage to said square root circuit.

16. The converter apparatus as claimed in claim 1 wherein said first and second controlled switching devices comprise semiconductor devices triggered on in mutually exclusive time intervals.

17. A high-frequency electronic apparatus comprising:

first and second input terminals for supplying a low frequency pulsating DC voltage to the high-frequency apparatus, first and second semiconductor controlled switching devices, an inductor, a rectifier element, an energy storage capacitor, means for coupling said first and second semiconductor controlled switching devices, said inductor, said rectifier element and said energy storage capacitor in circuit to said input terminals so as to form a high-frequency DC/AC inverter circuit, and a control circuit having output means coupled to control electrodes of the first and second semiconductor controlled switching devices so as to alternately trigger said first and second semiconductor controlled switching devices on and off at a high-frequency, said control circuit including means for triggering said first and second semiconductor controlled switching devices to produce a duty cycle that repetitively sweeps between a maximum duty cycle value and a minimum duty cycle value at a low frequency.

18. An electronic apparatus as claimed in claim 17 further comprising a voltage clamp coupled to said inductor and to said rectifier element in a manner so as to clamp the voltage of the rectifier element to a steady state value.

19. An electronic apparatus as claimed in claim 17 wherein said first and second semiconductor controlled switching devices are triggered in synchronism with said low frequency pulsating DC voltage.

20. An electronic apparatus as claimed in claim further comprising output means includes an LC resonant circuit having a resonant frequency below the switching frequency of said first and second semiconductor controlled switching devices.

21. A power supply for deriving a high frequency AC voltage for a load from a DC supply voltage comprising:

first and second input terminals for connection to a source of pulsating DC supply voltage, means coupling said input terminals to a circuit comprising an inductor, a rectifier element, a first switching transistor, a storage capacitor and a first diode connected together so that when the first switching transistor is turned on current flows from the input terminals through the first switching transistor, the inductor and the rectifier element and when the first switching transistor is turned off the inductor supplies a charge current to the storage capacitor via said first diode, a DC/AC inverter circuit coupled to said storage capacitor and comprising a second switching transistor, said first switching transistor, and output means for connection to said load, and a control circuit independent of an input voltage at said input terminals and responsive at least to a voltage on the storage capacitor and having an output coupled to the control electrodes of the first and second switching transistors so as to alternately trigger said first and second switching transistors on and off at a high frequency.

22. The power supply as claimed in claim 21 further comprising a diode voltage clamp coupled to at least one of said rectifier element and said inductor in a manner so as to clamp the voltage of the rectifier element to a steady state value and thereby substantially suppress any oscillation voltage that might develop across the rectifier element.

23. The power supply as claimed in claim 22 wherein said diode voltage clamp is connected between a first junction point between the inductor and the second input terminal and a second junction point of the storage capacitor and the second switching transistor.

24. The power supply as claimed in claim 21 wherein said control circuit comprises means responsive to said load voltage as well as said storage capacitor voltage for generating a high frequency alternating trigger voltage for the control electrodes of the first and second switching transistors and which trigger voltage is independent of any circuit constants of a load circuit coupled to said output means of the DC/AC inverter circuit.

25. The power supply as claimed in claim 21 wherein said control circuit comprises:

an error amplifier having a first input coupled to a source of reference voltage and a second input for receiving a voltage determined by the storage capacitor voltage, a square root circuit having input means for receiving at least a part of said pulsating DC supply voltage and a voltage determined by the storage capacitor voltage, and an output coupled to said second input of the error amplifier to supply it with a control voltage having a square root wave-form, a comparator circuit having a first input coupled to an output of the error amplifier, a second input, and an output, an oscillator independent of a load circuit coupled to said output means of the DC/AC inverter circuit and having an output coupled to said second input of the comparator circuit, and means responsive to a signal at the output of the comparator circuit for deriving a trigger control voltage for the first and second switching transistors that repetitively sweeps the duty ratio of the first and second switching transistors between a maximum value and a minimum value.

26. The power supply as claimed in claim 21 wherein said control circuit comprises means including a square root circuit and which is responsive to a voltage determined by the supply voltage and said storage capacitor voltage for deriving a control voltage having a square root waveform which controls the on/of time of the first and second switching transistors such that the duty ratio sweeps between a maximum value and a minimum value where the minimum value coincides approximately with a peak of the pulsating DC supply voltage.

27. The power supply as claimed in claim 26 wherein said control voltage deriving means further comprises:

means responsive to a voltage proportional to a peak value $V_m$ of the pulsating DC supply voltage and a voltage proportional to the storage capacitor voltage ($V_{ce}$) for deriving a signal voltage proportional to a parameter $M_p$, where $$M_p = \frac{V_{ce}}{V_m},$$

and wherein said square root circuit includes a first input responsive to said voltage determined by the supply voltage and a second input controlled by the derived signal voltage.

28. The power supply as claimed in claim 21 wherein said control circuit comprises;

an error amplifier having a first input coupled to a source of reference voltage and a second input for receiving a DC voltage determined by the load voltage and storage capacitor voltage, an oscillator circuit, and a comparator circuit having first and second inputs coupled to an output of the error amplifier and an output of the oscillator circuit, respectively, and an output which produces a control voltage for alternately triggering said first and second switching transistors on and off at said high frequency.

29. The power supply as claimed in claim 22 wherein;

said first and second switching transistors comprise first and second field effect transistors, respectively, of the same type, said inductor, said rectifier element and said first field effect transistor are connected in a first series circuit across said first and second input terminals, said inductor, said rectifier element, said storage capacitor and said second switching transistor are connected in a second series circuit across said first and second input terminals, and said storage capacitor, said output means and a further capacitor are connected in a third series circuit across the first switching transistor.

30. The power supply as claimed in claim 21 wherein;

said rectifier element, said storage capacitor and, said second switching transistor and said inductor are connected in a first series circuit across said input terminals and in the order named, said first switching transistor is connected between a junction of the rectifier element and the storage capacitor and a junction point of the inductor and the second switching transistor, said first diode being connected anti-parallel to the first switching transistor, and a voltage clamp diode connected between a junction of the storage capacitor and the second switching transistor and the second input terminal.

31. The power supply as claimed in claim 30 wherein said output means is coupled via a further capacitor across one of said first and second switching transistors.

32. The power supply as claimed in claim 21 wherein;

said storage capacitor is sub-divided into first and second capacitors, said rectifier element, said first switching transistor and said inductor are connected in a first series circuit across said input terminals and in the order named, said first and second capacitors and said second switching transistor are connected in a second series circuit across the first switching transistor, and a voltage clamp diode is connected between a junction point between the second capacitor and the second switching transistor and said second input terminal.

33. The power supply as claimed in claim 21 wherein said pulsating DC supply voltage is derived from a sinusoidal AC line voltage, and said control circuit comprises;

means responsive to said pulsating DC supply voltage as well as said storage capacitor voltage for generating a control voltage waveform that repetitively and non-linearly sweeps the duty ratio of the first and second switching transistors between a maximum value and a minimum value during each half period of the AC line voltage thereby to control input power to the power supply.

34. The power supply as claimed in claim 21 wherein;

said inductor, said rectifier element and said first switching transistor are connected in a first series circuit between said first and second input terminals, and said inductor, said rectifier element, said storage capacitor and said second switching transistor are connected in a second series circuit between said first and second input terminals and in the order named.

\* \* \* \* \*

UNITED STATES PATENT AND TRADEMARK OFFICE
CERTIFICATE OF CORRECTION

PATENT NO.    : 5,598,326 Page 1 of 1
DATED         : January 28, 1997
INVENTOR(S)   : Rui Liu and Wen-Jian Gu It is certified that error appears in the above-identified patent and that said Letters Patent is hereby corrected as shown below:

Column 13,
Line 21, after "claim" insert -- (17) --.

Signed and Sealed this

Twenty-sixth Day of November, 2002

Attest:

Attesting Officer

JAMES E. ROGAN
Director of the United States Patent and Trademark Office